United States Patent Office 3,803,239
Patented Apr. 9, 1974

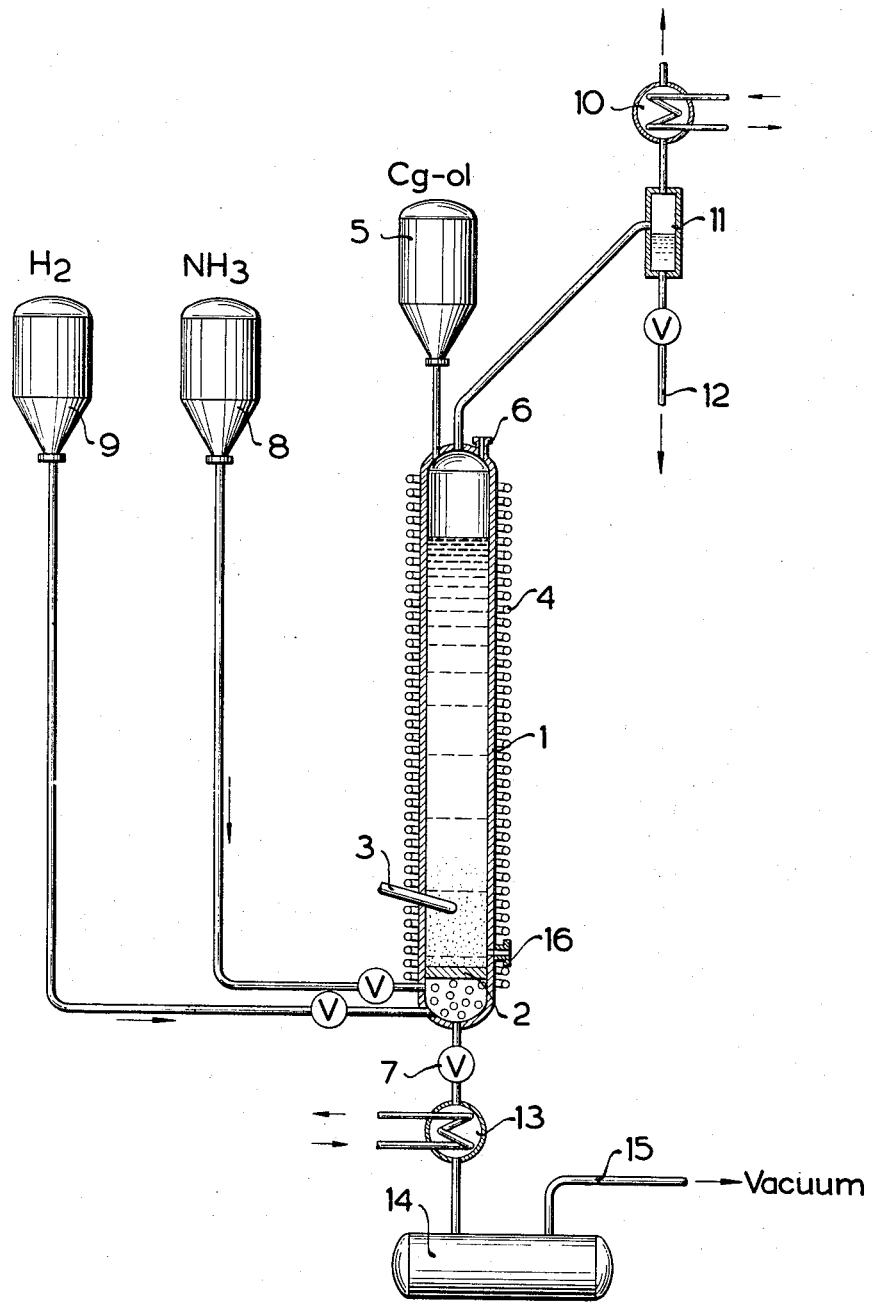

3,803,239
PROCESS FOR THE PRODUCTION OF TERTIARY AMINES
Hans Feichtinger, Dinslaken, Heinz Noeske, Oberhausen-Sterkrade-Nord, and Jurgen Falbe, Dinslaken, Germany, assignors to Ruhrchemie Aktiengesellschaft
Filed Mar. 14, 1972, Ser. No. 234,531
Claims priority, application Germany, Mar. 26, 1971, P 21 14 614.5
Int. Cl. C07c 85/02
U.S. Cl. 260—585 B            9 Claims

ABSTRACT OF THE DISCLOSURE

Tertiary amines are produced from saturated aliphatic alcohols having 8–22 carbon atoms respectively in the molecule or alcohols having 1–3 carbon atoms in an aliphatic chain substituted by mononuclear cycloaliphatic, aromatic or heterocyclic radicals and a mixture of ammonia and hydrogen in the presence of a hydrogenation-dehydrogenation catalyst at atmospheric pressure and elevated temperature with the continuous removal of water formed during the reaction from the reaction mixture by azeotropic distillation. The catalyst is in a powdered state, suspended in the alcohol and maintained in suspension throughout the entire reaction space by passing a finely distributed mixture of gaseous ammonia and hydrogen through the reaction mixture.

The process of producing tertiary amines by the reaction of primary alcohols in the presence of a hydrogenation-dehydrogenation catalyst with ammonia is known (U.S. Pat. 2,953,601). This process can be performed at atmospheric pressure. Water formed during the reaction may be continuously removed by azeotropic distillation with surplus alcohol and the separated alcohol recirculated to the reaction vessel. There is a serious drawback in this process, however, in that it always results in a mixture of primary, secondary and tertiary amines, whereby the yield of the desired tertiary amine amounts at most to 58 to 65%.

In order to overcome this drawback, the reaction has been carried through in two stages. In the first stage, a saturated alcohol containing 4 to 22 carbon atoms is reacted, in the presence of a hydrogenation-dehydrogenation catalyst, with ammonia. To the resulting mixture of primary, secondary, tertiary amines and non-reacted alcohol, additional alcohol is added, until the mixture contains the stoichiometric amount of alcohol necessitated for the conversion to tertiary amines, whereafter in the second stage the primary and secondary amines formed in the first stage are converted to tertiary amines in a temperature range between 190 and 230° C. Water formed during the reaction is continuously separated by azeotropic distillation (U.S. Pat. 3,223,734). Although yields of up to 98% of tertiary amines are mentioned, the said tertiary amines are contaminated by a series of undesired by-products. Their use therefore, is considerably restricted. These side-products are disturbing, for example, in the field of hydrometallurgy, since they seriously impair the separating capacity of the amines for metal ions.

It is therefore an object of this invention to provide a technically easy method of producing desired tertiary amines in a high purity with a satisfactory output and the highest efficiency of the catalyst. This object can only be obtained with the use of pulverulent catalysts. However, at the separation stage of said catalysts from the reaction product outside of the reactor, losses of 5 to 10% by weight of the catalyst are inevitable. Accordingly, the supply must be replenished by fresh catalyst. With the process according to the invention, it is possible to use powdered catalysts without the hereinbefore mentioned losses.

According to the invention, the process for the production of tertiary amines from saturated aliphatic alcohols containing 8 to 22 carbon atoms, as well as from alcohols containing 1 to 3 carbon atoms in an aliphatic chain substituted by mononuclear cycloaliphatic, aromatic or heterocyclic radicals, and a mixture of ammonia and hydrogen in the presence of a hydrogenation-dehydrogenation catalyst at atmospheric pressure and elevated temperature with continuous removal of water formed during the reaction from the reaction mixture by azeotropic distillation comprises suspending a powdered catalyst in the alcohol and maintaining it in a suspended whirling phase throughout the entire reaction space by passing a finely distributed mixture of gaseous ammonia and hydrogen from the bottom to the top of the reactor through the reaction mixture.

Any straight-and-branched chain aliphatic alcohols with the number of carbon atoms hereinbefore mentioned, as well as alcohols having 1 to 3 carbon atoms in an aliphatic chain substituted with mononuclear cycloaliphatic, aromatic or heterocyclic groups, as for example 3-phenylpropanol-(1), 2 - phenylpropanol-(1), hydroxymethylcyclohexane, are suited as starting materials for the process of the invention. Of the alcohols with heterocyclic substituents, those with oxygen as the hetero-atom are preferred, as for example, tetrahydrofurfurylalcohol. Especially well suited are the so-called "Oxoalcohols," which are prepared by hydroformylation of unsaturated hydrocarbons followed by hydrogenation.

Conventional hydrogenation-dehydrogenation catalysts, especially catalysts on the basis of nickel, cobalt, and iron can be used for the process according to the invention. Preferred catalysts are nickel containing carrier-catalysts, to which activators may have been added. Examples of preferred catalysts are catalysts of the following composition.

(1) 56–57% by weight nickel and carrier material (trade name: Ruhrchemie-catalyst 55/5)
(2) ca. 25% by weight nickel and carrier material (trade name: Ruhrchemie-catalyst 25/10)
(3) ca. 50% by weight nickel and carrier material (trade name: Ruhrchemie-catalyst 50/35)
(4) ca. 52–53% by weight nickel and carrier material (trade name: Ruhrchemie-catalyst 52/35)
(5) ca. 100 parts by weight nickel; 30 parts by weight chrome oxide; and 50 parts by weight diatomaceous earth.

The process according to the invention is generally carried through in a temperature range between 160 to 210° C., preferably between 185 and 195° C. Although ammonia and alcohol may be introduced in about a stoichiometric ratio, a small excess of alcohol is advantageously used. A molar ratio of alcohol to ammonia of 1:0.2 to 0.5, preferably, of 1:0.3 is especially well suited.

The amount of catalyst ranges advantageously between 5 to 20% of the weight of the alcohol. The particle size of the catalyst has to be chosen in such manner that it can be readily suspended, whirled up and uniformly distributed throughout the entire reactor volume.

Sinter-plates of glass, ceramics or iron forming the bottom of the preferably cylindric, reaction space are well suited for the fine distribution of the gas mixture whirling up the catalyst.

After termination of the reaction, the liquid reaction mixture can be drawn off through the gas-distributing device, while the catalyst remains quantitatively in the reaction space and can be used for the following process cycle. It can thus be used for at least 20 process cycles without decrease of its activity.

The attached figure represents a flow-scheme for a preferred working method of the invention.

A vertical steel tube 1, equipped with a gas permeable sinter plate 2 of glass, ceramics or iron in its lower part, a temperature measuring device 3 for the inside temperature of the reaction space and an electrical heating device 4 is charged with the alcohol to be converted from supply vessel 5. Through opening 6 the necessary hydrogention-dehydrogenation catalyst is introduced. A continuous stream of gaseous ammonia from supply vessel 8 and about an equal amount of hydrogen from supply vessel 9 are introduced into reactor 1, while valve 7 is closed. The temperature is regulated in such manner that it ranges at about the boiling point of the alcohol to be converted.

Water formed during the reaction is eliminated overhead by azeotropic distillation, the distillate condensed in cooler 10 and introduced into separator 11 from which a water phase is taken off from the system through line 12 and an upper alcohol phase recirculated to reactor 1.

Hydrogen introduced from supply vessel 9 into reactor 1 serves for restoring the activity of the catalyst and as carrier gas to improve elimination of water from the reaction mixture.

After termination of the reaction, the introduction of gaseous ammonia and hydrogen is shut off, valve 7 is opened and the raw tertiary amine product is drawn off through sinter plate 2 and introduced into collecting vessel 14 via cooler 13, where filtration through sinter plate 2 is facilitated by applying vacuum at 15. The catalyst remains on the sinter plate and can be reused.

After discharge of the reaction product from reactor 1, valve 7 is again closed, the reactor charged with alcohol and gaseous ammonia and hydrogen flow again started. The catalyst is again whirled up and reused in the process cycle. This can be repeated until the catalyst has lost its activity and is discharged via 16.

The following examples illustrate the invention.

EXAMPLE 1

The process of the invention was performed in a steel tube 1 having an interior diameter of 70 mm. and a height of 440 mm. In its lower part it is provided with a glass sinter plate 2 (apparatus glass, trade name C 4 Jenaer Glaswerke Schott u. Gen.), two valved inlet pipes for introduction of gaseous ammonia and hydrogen from 8 and 9 respectively and a valved discharge pipe 7. The upper part of reactor 1 is equipped with inlet 6 for hydrogenation-dehydrogenation catalyst, an inlet means for alcohol from 5 and a connecting pipe to separator 11 and cooler 10 for the condensation of water which is drawn off via 12.

The reaction vessel 1 was charged from vessel 5 with 870 g. isononylalcohol, obtained by hydroformylation of diisobutylene followed by hydrogenation of the resulting aldehyde, 87 g. of a powdered nickel carrier catalyst containing about 56 to 57% by weight nickel (catalyst No. 1) were introduced through opening 6. The reactor 1 was heated to 190° C. by an electrical heating coil. A uniform stream of 15 normal liters of gaseous ammonia and 15 normal liters hydrogen per hour was introduced. After passing-through of the gases, water of reaction and non-reacted isononylalcohol had been accumulated in separator 11. The introduction of ammonia was terminated after 3 hours while the hydrogen flow was maintained during a final reaction period of 3 hours. Thereafter, the hydrogen flow was terminated, valve 7 was opened and the liquid raw tertiary amine product was drawn off via cooler 13 to collecting vessel 14 by the aid of the vacuum of a water-jet pump.

Subsequently, the reactor was again charged with isononylalcohol and a further conversion with ammonia and hydrogen in the presence of the same catalyst performed, whereafter the catalyst remained in reactor 1 for repeated use without loss of its activity.

The raw amine product contained 91% by weight triisononylamine, 2% by weight diisononylamine, 2% by weight non-reacted isononylalcohol and 5% by weight of different side-products. By vacuum distillation of 100 kg. of the raw amine 79.0 kg. triisononylamine of 99% purity were obtained.

EXAMPLE 2

In the manner described in Example 1, 870 g. isononylalcohol and 70 g. of catalyst No. 5 of the composition hereinafter set out were introduced in the reactor:

|  | Parts by wt. |
|---|---|
| Nickel | 100 |
| Chrome oxide | 30 |
| Diatomaceous earth | 50 |

The temperature in the reaction space was 190° C. A stream of 14 N l. gaseous ammonia/h. and 14 N l. hydrogen/h. were passed through the liquid reaction mixture. The introduction of ammonia was terminated after 3 hours, while the introduction of hydrogen was maintained over a final reaction period of 3 hours. The resulting raw-amine product contained 90% by weight triisononylamine, 1% by weight diisononylamine and 4.5% by weight non-reacted isononylalcohol. By vacuum distillation, 83% of the raw-amine product was obtained as a final product was a content of 99.5% of the desired tertiary amine.

What we claim is:

1. In a process for the production of tertiary amines by reacting a saturated aliphatic alcohol containing 8 to 22 carbon atoms or an alcohol containing 1 to 3 carbon atoms in an aliphatic chain substituted by mononuclear cycloaliphatic, aromatic or heterocyclic radicals, and a mixture of ammonia and hydrogen in the presence of a hydrogenation-dehydrogenation catalyst at elevated temperature, water being formed during said reaction; removing said water continuously by azeotropic distillation, whereby a liquid reaction mixture remains, said catalyst suspended in a powdered state in said liquid reaction mixture, the improvement which comprises maintaining said catalyst in suspension by passing said gaseous ammonia and hydrogen through said liquid reaction mixture through a gas permeable sintered plate distribution device and drawing off said liquid reaction mixture through said gas distribution device after the reaction is completed.

2. The process as recited in claim 1 wherein said distribution device is sintered glass.

3. The process as recited in claim 1 wherein said distribution device is sintered ceramic.

4. The process as recited in claim 1 wherein said distribution device is sintered iron.

5. The process as recited in claim 1 wherein the catalyst is of the group consisting of 25% by weight nickel and carrier material; 50 to 57% by weight nickel and carrier material; 100 parts by weight nickel, 30 parts by weight chromium oxide, 50 parts by weight diatomaceous earth.

6. The process as recited by claim 1 wherein the reaction temperature is between 160° and 210° C.

7. The process as recited in claim 1 wherein the reaction temperature is between about 185° and 195° C.

8. The process as recited in claim 1 wherein the alcohol and the ammonia are in a molar ratio of 1:0.2 to 0.5.

9. The process as recited in claim 1 wherein the amount of catalyst is from 5–20% of the weight of the alcohol.

References Cited

UNITED STATES PATENTS

Re. 19,632   7/1935   Arnold _____ 260—585 B
2,953,601   9/1960   Whitaker _____ 260—585 B LEWIS GOTTS, Primary Examiner D. R. PHILLIPS, Assistant Examiner